United States Patent [19]

Caldwell et al.

[11] 4,291,227

[45] Sep. 22, 1981

[54] RAPID SCANNING SYSTEM FOR FUEL DRAWERS

[75] Inventors: John T. Caldwell; Paul E. Fehlau; Stephen W. France, all of Los Alamos, N. Mex.

[73] Assignee: The United States of America as represented by the United States Department of Energy, Washington, D.C.

[21] Appl. No.: 90,845

[22] Filed: Nov. 2, 1979

[51] Int. Cl.³ .......................... G01T 1/00; H01J 47/12
[52] U.S. Cl. .................................. 250/328; 250/390; 250/392
[58] Field of Search ................... 250/328, 361 R, 366, 250/369, 370, 390, 391, 392

[56] References Cited

U.S. PATENT DOCUMENTS

| | | | |
|---|---|---|---|
| 3,047,720 | 7/1962 | Rickard | 250/366 |
| 3,073,959 | 1/1963 | Jervis | 250/392 |
| 3,496,357 | 2/1970 | Weinzierl et al. | |
| 3,717,765 | 2/1973 | Hiller | |
| 3,786,256 | 1/1974 | Untermeyer | |
| 3,786,257 | 1/1974 | Weiss et al. | |
| 4,002,908 | 1/1977 | Contarel | 250/328 |
| 4,217,496 | 8/1980 | Daniels et al. | 250/369 |

OTHER PUBLICATIONS

Lakosi, L. et al., "Uranium Assay of Fuel Rods by Passive Gamma-ray Spectrometry", ERA vol. 4, No. 11, Jun. 15, 1979.

Ruhter, W. D., et al., "Nondestructive Assay of Mixed Uranium-Plutonium Oxides by Gamma-Ray Spectrometry", ERA vol. 4, No. 10, May 13, 1979.

*Primary Examiner*—Alfred E. Smith
*Assistant Examiner*—Janice A. Howell
*Attorney, Agent, or Firm*—Paul D. Gaetjens; Richard G. Besha; James E. Denny

[57] ABSTRACT

A nondestructive method for uniqely distinguishing among and quantifying the mass of individual fuel plates in situ in fuel drawers utilized in nuclear reactors is described. The method is both rapid and passive, eliminating the personnel hazard of the commonly used irradiation techniques which require that the analysis be performed in proximity to an intense neutron source such as a reactor. In the present technique, only normally decaying nuclei are observed. This allows the analysis to be performed anywhere. This feature, combined with rapid scanning of a given fuel drawer (in approximately 30 s), and the computer data analysis allows the processing of large numbers of fuel drawers efficiently in the event of a loss alert.

12 Claims, 1 Drawing Figure

Pu PLATE SCANNER

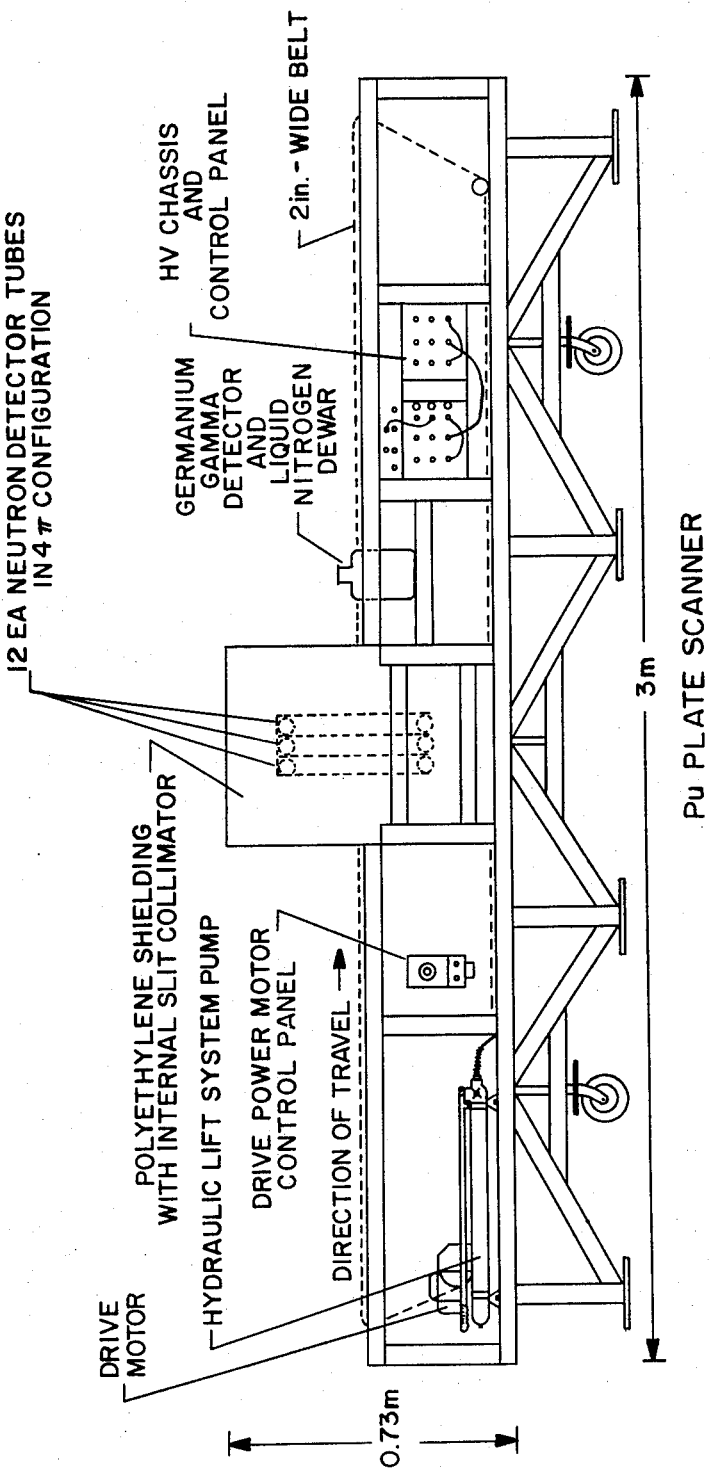

RAPID SCANNING SYSTEM FOR FUEL DRAWERS

BACKGROUND OF THE INVENTION

1. Field of the Invention

A nondestructive method and apparatus for uniquely distinguishing among and quantifying the mass of individual nuclear fuel plates in situ in fuel drawers utilized in nuclear reactors is described. The method is both rapid and passive, reducing the personnel hazard of the commonly used irradiation techniques. It comprises simultaneous collimated neutron and collimated, energy resolved gamma ray analyses. The spatial resolution of both is sufficient to identify the smallest expected unit plate which is 2.5 cm long.

Said simultaneous neutron and gamma ray analysis is crucial to avoid intentional attempts to confound the procedure for the purpose of theft of fissile materials. The several pieces of information obtained for each fuel element make successful illegal substitution of materials in an attempt to deceive the system, virtually impossible, whereas, for example, simple neutron monitoring could be quite readily overcome. High spatial resolution of the present method also prevents the averaging of neutron or gamma events essential in the deception by substitution.

The invention is a result of a contract with the Department of Energy.

2. Description of Prior Art

The novelty search has produced several patents which differ from the instant invention in one or more of several ways. The most important and prevalent difference is that many of these patents teach neutron irradiation of the sample to be investigated with subsequent analysis of the resulting neutrons and gamma rays which arise from nuclear decomposition (U.S. Pat. Nos. 3,496,357 and 3,786,256 exemplify this approach.) The instant invention provides sufficient sensitivity to simply monitor the spontaneous decomposition of normally radioactive nuclei, thereby eliminating the hazard and inconvenience of neutron irradiation. The second salient difference is that those patents which do not actually mention neutron irradiation but suggest simultaneous neutron and gamma ray monitoring of samples do not teach energy resolved gamma analysis (See, e.g., U.S. Pat. No. 3,786,257.) A third group mentions either resolved gamma or resolved neutron analysis but not a combination of the two (See U.S. Pat. No. 3,717,765 for a description of the use of gamma spectroscopy, for example). A maximum of non-destructively and rapidly obtained sample information is crucial to the method of the instant invention which uses such analysis to quantitatively identify all radioactive elements present in nuclear fuel samples to reduce the possibility of willful deception by potential thieves.

The simultaneous, rapid use of both spatial resolving power along with isotope specific gamma and neutron materials identification of an unirradiated fuel sample is therefore unique. Further, the use of $^3$He proportional counters in a collimated neutron scanning system is novel by itself.

STATEMENT OF THE OBJECTS

An object of the present invention is to rapidly, nondestructively, uniquely and quantitatively identify the mass of individual nuclear fuel plates according to their radioisotope composition.

Another object of the invention is to reduce the hazard and inconvenience of such analysis which are usually performed by simultaneous neutron irradiation of the sample and investigation of the resulting neutrons and gamma rays produced from nuclear disintegration.

Another object is the prevention of repeated, premeditated theft of small quantities of fissile materials by the alteration of the isotopic composition of the fuel elements.

Another object is the examination of said nuclear fuel plates in situ in the fuel drawers currently utilized in nuclear reactors.

Another object is the rapid characterization of irradiation products of non-fuel materials with regard to transuranic isotopes and other radioactive species.

Other objects, advantages and novel features of the invention will become apparent to those skilled in the art upon examination of the following detailed description of a preferred embodiment of the invention and the accompanying drawing.

SUMMARY OF THE INVENTION

The method of this invention teaches simultaneous neutron and energy resolved gamma scans of nuclear fuel elements with spatial resolution sufficient to identify the smallest expected unit plate which is presently 2.5 cm long, at a rate of 2.5 cm/s. The neutron scan senses the spontaneous fission neutrons from $^{240}$Pu and serves to characterize the isotopic content of this element in the fuel plate. Collimation of the neutrons essential for the spatial resolution is achieved by a polyethelene slot arrangement. The reduced neutron counts resulting from this collimation are compensated for by the use of four $^3$He proportional counters arranged at 90° intervals around a circle perpendicular to the direction of travel of the drawers. An energy resolved gamma ray scan simultaneously characterizes the $^{239}$Pu, $^{241}$Pu, $^{241}$Am, and $^{235}$U in particular as well as any other isotopic content for species which emit spontaneous gamma radiation. Appropriate energy resolution of these specific gamma rays is provided by a Ge(Li) detector. An on-line least-squares analysis comparison of the observed scan data to that expected for the given drawer is achieved using a microprocessor control system. The apparatus of this invention further includes a conveyor system whereby fuel drawers are carried past the gamma and neutron detectors. The method and apparatus can be used to analyze more general radioactive products from irradiation of materials other than fuel elements. It is both rapid and passive reducing the inconvenience and personnel hazard of the commonly used irradiation techniques.

BRIEF DESCRIPTION OF THE DRAWING

The FIGURE is a schematic drawing of the proposed neutron/gamma rapid scanning instrument for reactor drawers containing plutonium fuel.

DESCRIPTION OF THE PREFERRED EMBODIMENTS

In a preferred embodiment, the system is designed to scan typical fuel drawers at a rate of one or two per minute, with a sensitivity adequate to detect the presence or absence of a typically 1-in.-long plutonium fuel plate in a drawer containing as much as 36 in. (total) of plutonium fuel and a variety of coolant, structural, and fertile mockup materials also present in the drawer. The technique assumes that the plutonium fuel plates in the facility inventory are well characterized but does not require that all fuel plates have the same $^{240}$Pu, $^{241}$Am, etc., isotopic content, these radioisotopes being in sufficient abundance to be easily monitored and sufficient in number to ensure against clandestine theft of nuclear materials by simple alteration of the fuel element composition in a given set of drawers. An example of possible fuel inventory variation is shown in Table I. Table II shows the measured or calculated neutron and isotope-specific gamma intensities for the plutonium fuel plates listed in Table I. The neutron and gamma line intensities are tabulated as relative values per inch of fuel plate, with the Pu/U/Mo fuel of 11.56% $^{240}$Pu content arbitrarily designated as the unity response.

TABLE I

TYPICAL ISOTOPIC VALUES FOR A VARIETY OF PLUTONIUM FUELS IN A CRITICAL FACILITY

| Fuel Type | $^{239}$Pu (%) | $^{240}$Pu (%) | $^{241}$Pu (%) | $^{241}$Am (%) | Plutonium Per Inch (g) |
|---|---|---|---|---|---|
| Pu/Al | 95.25 | 4.50 | 0.20 | 0.24 | 34.1 |
| Pu/U/Mo | 90.80 | 8.66 | 0.51 | 0.46 | 20.0 |
| Pu/U/Mo | 87.00 | 11.56 | 1.20 | 0.59 | 31.1 |
| Pu/Al | 74.20 | 22.33 | 2.86 | 1.80 | 35.3 |
| Pu/U/Mo | 68.70 | 26.40 | 3.39 | 2.19 | 37.7 |

TABLE II

MEASURED (OR CALCULATED) NEUTRON AND GAMMA RESPONSES FOR A VARIETY OF PLUTONIUM FUELS

| Fuel Type | $^{240}$Pu (%) | Relative Total Neutrons per Inch | Relative Total $^{239}$Pu (414 keV γ/ inch) | Relative Total $^{241}$Am (662 keV γ/ inch) |
|---|---|---|---|---|
| Pu/Al | 4.50 | 0.73 ± 0.07 | (1.26 ± 0.13) | (0.42 ± 0.04) |
| Pu/U/Mo | 8.66 | 0.47 ± 0.05 | (0.67 ± 0.07) | (0.49 ± 0.05) |
| Pu/U/Mo | 11.56 | 1.00 ± 0.10 | 1.00 ± 0.10 | 1.00 ± 0.10 |
| Pu/Al | 22.33 | 3.17 ± 0.32 | 0.96 ± 0.10 | 3.44 ± 0.30 |
| Pu/U/Mo | 26.40 | (2.75 ± 0.28) | (0.95 ± 0.10) | (4.47 ± 0.45) |

As can be seen in Table II, each of the five classes of plutonium fuel has a characteristic signature when the three independent quantities (total neutron, $^{239}$Pu Y, $^{241}$Am Y) are considered. Furthermore, based on experimental measurements with 25 separate fuel plates taken from among the first four classes listed in Table II, the uniformity in the signature from plate to plate within a class appears to be quite good. This is probably due to the excellent quality control required in the manufacture of such plates. The Pu/U/Mo plates have a neutron output consistent with 100% spontaneous fission, but the Pu/Al plates have an additional Al ($\alpha$,n) component (~70% for the 4.50% $^{240}$Pu plates and about 50% for the 22.33% $^{240}$Pu plates).

A design of the scanning apparatus required to perform a fuel-drawer inventory measurement is shown in the FIGURE. Fuel drawers are loaded on to a "conveyor belt" that transports them, first through a collimated fast-neutron detector, and subsequently past a collimated intrinsic Ge or Ge(Li) gamma detector. For ease and accuracy of drawer identification, it is recommended that each drawer be tagged with a "grocery store"-type laser-scan identification label. This label could also contain information on the drawer's current plutonium content. A photocell-laser sensing system would read the label. The drawer identification could be routed to a microprocessor- or minicomputer-based data acquisition system. The observed "signature" for each inch of fuel plate in the drawer (as determined by the neutron output and at least two isotopic gamma lines) could then be compared to the expected values. Passing would require that each inch of the drawer checks against expected values. Count rates for the conceptual design of the FIGURE (both neutron and gamma) are such that a statistically reliable signature for an inch of any plutonium fuel plate considered in Table 2 can be obtained in <1 s. The signature for the combination of any two fuel types (two rows of fuel plates in a drawer) is also obtained statistically in less than 1 s/in. Table 2 also shows that accuracies of each attribute measurement need only be ±10% in order to verify a signature. For most cases, an even poorer accuracy would suffice. The apparatus and method has been tested in separate neutron and specific gamma scanning prototypes and an integral unit is under construction. The method can be considered successfully proven, based on these prototype data with actual Pu fuel plates simulating typical Pu containing fuel drawers.

The neutron scan ($\geq$10% solid angle and overall 4% direction efficiency) senses primarily spontaneous fission neutrons from $^{240}$Pu and thus, serves to characterize $^{240}$Pu isotopic content. Collimation of the neutrons essential for the spatial resolution is achieved by a polyethylene slot arrangement. The reduced neutron counts resulting from this collimation are compensated for by the use of four $^3$He detectors arranged at 90° intervals around a circle perpendicular to the direction of travel of the drawers. The gamma scan in principle could be used to additionally characterize $^{239}$Pu, $^{241}$Pu, $^{241}$Am, $^{235}$U, and $^{238}$U (as well as any other) isotopic content, by utilizing various specific gamma lines. In the present version, however, a more limited selection of strongly emitted $^{241}$Am and $^{239}$Pu gamma lines will be used. (661 keV for $^{241}$Am characterization and 414 keV for $^{239}$Pu characterization.) A Ge(Li) or HPGe detector will be used to assure proper energy resolution of these specific gamma rays. Thus, with the present invention, a quantitative characterization of three separate transuranic isotopes is achieved in the scan. Since fuel plates of differing types (a typical U.S. zero power reactor may have five separate fuel plate types in its inventory) will have different mixes of the $^{240}$Pu, $^{239}$Pu, and $^{241}$Am isotopes, the method serves to uniquely distinguish among the five types and to quantify the mass of fuel plates. A key feature of this system is the microprocessor control of the entire operation. This is necessary since the sheer volume of data generated in a short period of time is immense. In addition, the identification process requires an on-line least-squares analysis comparison of the observed scan data to that expected for the given drawer. The amount and rate of data analysis required is easily handled with a micro-NOVA-type unit. Microprocessor control will also facilitate transfer of the scan results to a larger CPU wherein detailed inventory can be kept up to date.

At present, this system will probably be most useful in rapid Pu fuel inventory measurements at facilities having large Pu inventories. With suitable modifications (primarily in the acceptance cross section of the scanner), the system might also be useful in verifying a wide variety of well-characterized Pu and U containing materials, for example, a unit in which a continuous active neutron interrogation is performed during the scan process is under investigation. With this feature, $^{235}$U may be identifiable through $^{235}$U(n,f) reactions and detection of prompt or delayed neutrons. Additional specific gamma ray lines would be selectable for this purpose as well (186 keV for $^{235}$U, 1001 for $^{238}$U, etc.). The principle would be essentially the same, a simultaneous collimated neutron and specific gamma ray characterization of the materials. It is clear that such a system is considerably more difficult to subvert than verifications based on either neutron or gamma signatures alone. In addition, by requiring a signature check on each inch of fuel plate (as opposed to a signature check of an integral drawer), a successful diverter would have to be quite resourceful. Finally, the instant invention, unlike conventional techniques, does not require sample irradiation with its required proximity to an intense neutron source and inherent hazards. Therefore, the analysis can be performed virtually anywhere.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended thereto.

What is claimed is:

1. In a system for rapidly investigating nuclear fuel drawers, the method comprising:
   (a) quantitative sensing of neutrons produced by nuclear decomposition;
   (b) simultaneous, energy resolved monitoring of emitted gamma rays;
   (c) automatic reading of fuel drawer identifying information; and
   (d) analyzing in real time the information obtained for said fuel drawers by steps (a) through (c) utilizing a microprocessor.

2. The method of claim 1 wherein said neutrons and gamma rays are produced from the spontaneous, normal decay of the radioactive nuclei present in said fuel drawers.

3. The method of claim 2 wherein an on-line least-squares analysis provides a comparison of said scan data to that expected for a given fuel drawer.

4. The method of claim 1 wherein said neutrons detected are primarily spontaneous decomposition products of $^{240}$Pu nuclei present in said nuclear fuel drawer.

5. The method of claim 4 wherein said energy resolved gamma scan simultaneously characterizes $^{239}$Pu, $^{241}$Pu, $^{241}$Am and $^{235}$U present in said nuclear fuel drawer as a result of their spontaneous gamma emissions.

6. In a system for rapidly investigating nuclear fuel drawers, the apparatus comprising:
   (a) a conveyor mechanism to move said fuel drawers through the apparatus,
   (b) a drawer identification sensor to uniquely identify said fuel drawers before they enter the radiation detecting devices,
   (c) a neutron detector,
   (d) a separate gamma ray detector which follows said neutron detector, and
   (e) a microprocessor for control and data analysis.

7. The apparatus of claim 6 wherein said drawer identification is achieved by tagging each drawer with a laser-scan identification label and using a photocell/laser sensing system to read said labels.

8. The apparatus of claim 6 wherein said neutron and gamma detectors have a spatial resolution of 2.5 cm, the smallest expected unit plate, as a result of careful beam collimation.

9. The apparatus of claim 8 wherein said neutron collimation is achieved by a polyethylene slot arrangement.

10. The apparatus of claim 9 wherein the reduced neutron counts resulting from said collimation are compensated for by the use of four $^3$He proportional counters arranged at 90° intervals around a circle perpendicular to the direction of travel of said fuel drawers.

11. The apparatus of claim 10 wherein the appropriate energy resolution of said gamma scans is obtained by the use of a Ge(Li) detector.

12. The apparatus of claim 11 wherein a conveyor allows drawers to be run through at the rate of 1 inch per second or approximately two drawers per minute.

* * * * *